(12) United States Patent
Hattori et al.

(10) Patent No.: US 11,117,993 B2
(45) Date of Patent: Sep. 14, 2021

(54) FLUORINATED ELASTIC COPOLYMER AND METHOD FOR ITS PRODUCTION, FLUORINATED ELASTIC COPOLYMER COMPOSITION, AND CROSSLINKED RUBBER ARTICLE

(71) Applicant: AGC Inc., Chiyoda-ku (JP)

(72) Inventors: Yukiko Hattori, Chiyoda-ku (JP); Takehiro Kose, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 16/699,885

(22) Filed: Dec. 2, 2019

(65) Prior Publication Data

US 2020/0102411 A1 Apr. 2, 2020

Related U.S. Application Data

(63) Continuation of application No. PCT/JP2018/023666, filed on Jun. 21, 2018.

(30) Foreign Application Priority Data

Jun. 27, 2017 (JP) .............................. JP2017-124890

(51) Int. Cl.

| C08F 214/26 | (2006.01) |
|---|---|
| C08F 2/22 | (2006.01) |
| C08F 6/16 | (2006.01) |
| C08F 6/22 | (2006.01) |
| C08F 214/22 | (2006.01) |
| C08F 236/20 | (2006.01) |
| C08F 236/22 | (2006.01) |
| C08K 5/00 | (2006.01) |

(52) U.S. Cl.
CPC .............. *C08F 214/26* (2013.01); *C08F 2/22* (2013.01); *C08F 6/16* (2013.01); *C08F 6/22* (2013.01); *C08F 214/22* (2013.01); *C08F 236/20* (2013.01); *C08F 236/22* (2013.01); *C08K 5/0025* (2013.01)

(58) Field of Classification Search
USPC .......................................................... 526/252
See application file for complete search history.

(56) References Cited

U.S. PATENT DOCUMENTS

| 2004/0147698 A1 | 7/2004 | Tanaka et al. |
| 2006/0270780 A1* | 11/2006 | Xu .......................... C08L 33/22 |
| | | 524/501 |
| 2012/0190796 A1 | 7/2012 | Funaki et al. |

FOREIGN PATENT DOCUMENTS

| CN | 105992777 A | 10/2016 |
| WO | WO 99/50319 A1 | 10/1999 |
| WO | WO 2010/082633 A1 | 7/2010 |
| WO | WO 2017/086323 A1 | 5/2017 |
| WO | WO 2018/089256 A1 | 5/2018 |

OTHER PUBLICATIONS

International Search Report dated Sep. 4, 2018 in PCT/JP2018/023666 filed on Jun. 21, 2018, 2 pages.

* cited by examiner

*Primary Examiner* — Fred M Teskin

(74) *Attorney, Agent, or Firm* — Oblon, McClelland, Maier & Neustadt, L.L.P.

(57) ABSTRACT

To provide a fluorinated elastic copolymer having a low content of metal elements and being excellent in crosslinkability. This fluorinated elastic copolymer has iodine atoms and has units a based on tetrafluoroethylene, units b based on a monomer having one polymerizable unsaturated bond (but excluding tetrafluoroethylene), and units c based on a fluorinated monomer having at least two polymerizable unsaturated bonds, wherein the metal content is at least 0.3 ppm by mass and at most 20.0 ppm by mass.

10 Claims, No Drawings

FLUORINATED ELASTIC COPOLYMER AND METHOD FOR ITS PRODUCTION, FLUORINATED ELASTIC COPOLYMER COMPOSITION, AND CROSSLINKED RUBBER ARTICLE

This application is a continuation of PCT Application No. PCT/JP2018/023666, filed on Jun. 21, 2018, which is based upon and claims the benefit of priority from Japanese Patent Application No. 2017-124890 filed on Jun. 27, 2017. The contents of those applications are incorporated herein by reference in their entireties.

TECHNICAL FIELD

The present invention relates to a fluorinated elastic copolymer and a method for its production, a fluorinated elastic copolymer composition containing said fluorinated elastic copolymer, and a crosslinked rubber article made by crosslinking said fluorinated elastic copolymer or fluorinated elastic copolymer composition.

BACKGROUND ART

A crosslinked rubber article obtained by crosslinking a fluorinated elastic copolymer is excellent in chemical resistance, solvent resistance, heat resistance, etc., and thus is suitable as a sealing material for a semiconductor manufacturing apparatus to be used in harsh environments. The sealing material for a semiconductor manufacturing apparatus is required not to release metal components which adversely affect semiconductor products, as far as possible. Thus, as the sealing material for a semiconductor manufacturing apparatus, it is necessary to use one having a low content of metal elements.

As a fluorinated elastic copolymer having a low content of metal elements, the following one has been proposed.

A fluorinated elastic copolymer obtained by obtaining a latex containing a fluorinated elastic copolymer by an emulsion polymerization method using no metal compound, coagulating the fluorinated elastic copolymer in the latex by using an acid containing no metal elements, and washing the coagulated fluorinated elastic copolymer with a water-insoluble solvent (Patent Document 1).

In Patent Document 1, Examples are described wherein the content of metal elements was reduced in a copolymer of TFE (tetrafluoroethylene), PNVE represented by $CF_3CF_2CF_2O(CF(CF_3)CF_2O)_2CF=CF_2$ and IM represented by $ICH_2CF_2CF_2OCF=CF_2$ (Examples 1 and 3), a copolymer of TFE and PMVE (perfluoromethylvinyl) (Example 2), a copolymer of TFE, PMVE and IM (Examples 4 and 5), or a copolymer of TFE, PMVE and CNVE represented by $CF_2=CFOCF_2CF(CF_3)OCF_2CF_2CN$ (Example 6).

PRIOR ART DOCUMENT

Patent Document

Patent Document 1: WO1999/050319

DISCLOSURE OF INVENTION

Technical Problem

However, the fluorinated elastic copolymers as described in Examples of Patent Document 1 are inferior in crosslinkability, and thus, physical properties of crosslinked rubber articles obtainable by crosslinking the fluorinated elastic copolymers are not sufficient.

The present invention is to provide a fluorinated elastic copolymer which has a low content of metal elements and which is excellent in crosslinkability, and a method for its production, a fluorinated elastic copolymer composition employing the fluorinated elastic copolymer which has a low content of metal elements and which is excellent in crosslinkability, and a crosslinked rubber article.

Solution to Problem

The present invention has the following embodiments.

<1> A fluorinated elastic copolymer having iodine atoms and having units a based on tetrafluoroethylene, units b based on a monomer having one polymerizable unsaturated bond (but excluding tetrafluoroethylene), and units c based on a fluorinated monomer having at least two polymerizable unsaturated bonds, wherein the metal content is at least 0.3 ppm by mass and at most 20.0 ppm by mass.

<2> The fluorinated elastic copolymer according to <1>, wherein the units b are at least one type selected from units based on a compound represented by the following formula (1), units based on a compound represented by the following formula (2), units based on ethylene, and units based on propylene, $$CF_2=CFOR^{f1} \quad (1)$$

(wherein $R^{f1}$ is a $C_{1-10}$ perfluoroalkyl group), $$CF_2=CF(OCF_2CF_2)_n-(OCF_2)_m-OR^{f2} \quad (2)$$

(wherein $R^{f2}$ is a $C_{1-4}$ perfluoroalkyl group, n is an integer of from 0 to 3, m is an integer of from 0 to 4, and n+m is an integer of from 1 to 7).

<3> The fluorinated elastic copolymer according to <2>, wherein the units b are at least one type selected from units based on a compound represented by the above formula (1) wherein the number of carbon atoms in $R^{f1}$ is from 1 to 3, units based on a compound represented by the above formula (2) being any of compounds represented by the following formulae, and units based on propylene:

$$CF_2=CF-OCF_2CF_2-OCF_2-OCF_2-OCF_2-OCF_2-OCF_3$$

$$CF_2=CF-OCF_2CF_2-OCF_2-OCF_2-OCF_3$$

$$CF_2=CF-OCF_2CF_2-OCF_2CF_2-OCF_2CF_3$$

<4> The fluorinated elastic copolymer according to any one of <1> to <3>, wherein the units c are units based on a compound represented by the following formula (3):

$$CF_2=CFOR^{f3}OCF=CF_2 \quad (3)$$

(wherein $R^{f3}$ is a $C_{1-25}$ perfluoroalkylene group or a group having at least one etheric oxygen atom between carbon-carbon atoms in a $C_{2-25}$ perfluoroalkylene group).

<5> The fluorinated elastic copolymer according to <4>, wherein the units c are units based on any of compounds represented by the following formulae:

$$CF_2=CFO(CF_2)_3OCF=CF_2$$

$$CF_2=CFO(CF_2)_4OCF=CF_2$$

<6> A fluorinated elastic copolymer composition comprising a fluorinated elastic copolymer as defined in any one of <1> to <5>, and a crosslinking agent.

<7> A crosslinked rubber article obtained by crosslinking the fluorinated elastic copolymer as defined in any one of <1> to <5> or the fluorinated elastic copolymer composition as defined in <6>.

<8> A method for producing a fluorinated elastic copolymer as defined in any one of <1> to <5>, which comprises emulsion polymerizing tetrafluoroethylene, a monomer having one polymerizable unsaturated bond (but excluding tetrafluoroethylene), and a fluorinated monomer having at least two polymerizable unsaturated bonds, in the presence of a radical polymerization initiator and a compound represented by the following formula (4), to obtain a latex containing a fluorinated elastic copolymer, and coagulating the fluorinated elastic copolymer in the latex by using an acid containing no metal elements:

$$R^{fA}I_2 \quad (4)$$

wherein $R^{fA}$ is a $C_{1-16}$ polyfluoroalkylene group.

<9> The method for producing a fluorinated elastic copolymer according to <8>, wherein after said coagulation, the coagulated copolymer is washed by using a liquid medium wherein the content of metal elements is at most 2 ppm by mass.

Advantageous Effects of Invention

The fluorinated elastic copolymer of the present invention has a low content of metal elements and is excellent in crosslinkability.

The fluorinated elastic copolymer composition of the present invention has a low content of metal elements and is excellent in crosslinkability.

The cross-linked rubber article of the present invention has a low content of metal elements, and is excellent in physical properties.

DESCRIPTION OF EMBODIMENTS

Hereinafter, a compound represented by the formula (1) will be referred to as a compound (1). Compounds represented by other formulae will be referred to in the same manner.

In this specification, the meanings of the following terms are as follows.

A "unit based on a monomer" is a generic term for an atomic group directly formed by polymerization of one molecule of the monomer and an atomic group obtainable by chemically converting a part of said atomic group. In this specification, a unit based on a monomer, may simply be referred to also as a monomer unit.

The content of metal elements in a liquid medium is a total value of contents of 29 types of metal elements (Fe, Na, K, Li, Be, Mg, Al, Ca, Ti, V, Cr, Mn, Co, Ni, Cu, Zn, Ga, Rb, Sr, Zr, Mo, Ag, Cd, In, Sn, Cs, Ba, Pb, Bi) measured by the absolute calibration curve method using an inductively coupled plasma mass spectrometer.

The content of metal elements in a fluorinated elastic copolymer is a total value of contents of 29 types of metal elements (Fe, Na, K, Li, Be, Mg, Al, Ca, Ti, V, Cr, Mn, Co, Ni, Cu, Zn, Ga, Rb, Sr, Zr, Mo, Ag, Cd, In, Sn, Cs, Ba, Pb, Bi) measured by the absolute calibration curve method using an inductively coupled plasma mass spectrometer, with respect to a liquid obtained by putting a fluorinated elastic copolymer to be measured, in a platinum crucible, and ashing it in a high temperature electrically heated furnace, followed by sulfuric acid white smoke treatment and dissolution in dilute nitric acid.

Fluorinated Elastic Copolymer

The content of metal elements in the fluorinated elastic copolymer of the present invention is at most 20.0 ppm by mass, preferably at most 10.0 ppm by mass, more preferably at most 5.0 ppm by mass. When the content of metal elements is at most the upper limit value in the above range, it is possible to sufficiently suppress the release of metal components which affect semiconductor products, at the time when a crosslinked rubber article made of the fluorinated elastic copolymer is used as a sealing material for a semiconductor manufacturing apparatus. The lower limit value for the content of metal elements is 0.3 ppm by mass. When the content of metal elements is at least the lower limit value in the above range, at the time when a crosslinking agent is added to prepare a fluorinated elastic copolymer composition, crosslinkability will be more excellent, and at the same time, dispersibility of a filler or reinforcing material will also be improved.

The fluorinated elastic copolymer of the present invention has iodine atoms and at the same time, has units a, units b and units c.

Units a are units (hereinafter referred to also as TFE units) based on tetrafluoroethylene (hereinafter referred to also as TFE).

The proportion of units a is preferably from 35 to 75 mol %, more preferably from 40 to 75 mol %, further preferably from 50 to 75 mol %, in all units constituting the fluorinated elastic copolymer.

Units b are units based on a monomer having one polymerizable unsaturated bond (but excluding tetrafluoroethylene).

Specific examples of the units b may be units (hereinafter referred to also as PAVE units) based on the later-described compound (1), units (hereinafter referred to also as POAVE units) based on the later-described compound (2), units based on ethylene, units based on propylene, units based on a monomer having fluorine atoms and a halogen atom other than a fluorine atom (bromotrifluoroethylene, iodotrifluoroethylene, etc.), and units based on a monomer having fluorine atoms and a nitrile group ($CF_2=CFO(CF_2)_5CN$, perfluoro(8-cyano-5-methyl-3,6-dioxa-1-octene), etc.).

PAVE units are units based on compound (1), and POAVE units are units based on compound (2).

$$CF_2=CFOR^{f1} \quad (1)$$

wherein $R^{f1}$ is a $C_{1-10}$ perfluoroalkyl group.

$$CF_2=CF(OCF_2CF_2)_n—(OCF_2)_m—OR^{f2} \quad (2)$$

wherein $R^{f2}$ is a $C_{1-4}$ perfluoroalkyl group, n is an integer of from 0 to 3, m is an integer of from 0 to 4, and n+m is an integer of from 1 to 7.

In the compound (1), the perfluoroalkyl group as $R^{f1}$ may be linear or may be branched. The number of carbon atoms in $R^{f1}$ is preferably from 1 to 5, more preferably from 1 to 3, from such a viewpoint that productivity of the fluorinated elastic copolymer will thereby be improved.

Specific examples of the compound (1) may be the following ones. Here, the expressions after the formulae are abbreviations for the compounds.

$CF_2=CFOCF_3$:PMVE $CF_2=CFOCF_2CF_3$:PEVE $CF_2=CFOCF_2CF_2CF_3$:PPVE $CF_2=CFOCF_2CF_2CF_2CF_3$

As the compound (1), from such a viewpoint that productivity of the fluorinated elastic copolymer will be improved, PMVE, PEVE or PPVE is preferred.

In the compound (2), the perfluoroalkyl group as $R^{f2}$ may be linear or may be branched. The number of carbon atoms in $R^{f2}$ is preferably from 1 to 3.

When n is 0, m is preferably 3 or 4.

When n is 1, m is preferably an integer from 2 to 4.

When n is 2 or 3, m is preferably 0.

n is preferably an integer of from 1 to 3.

When the number of carbon atoms in $R^{f2}$, n and m are within the above ranges, low-temperature characteristics will be further excellent at the time when the fluorinated elastic copolymer is made into a crosslinked rubber article, and productivity of the fluorinated elastic copolymer will be improved.

Specific examples of the compound (2) may be the following ones. Here, the expressions after the formulae are abbreviations for the compounds.

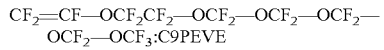
$CF_2=CF-OCF_2CF_2-OCF_2-OCF_2-OCF_2-$
$OCF_2-OCF_3$:C9PEVE

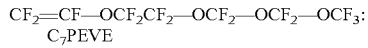
$CF_2=CF-OCF_2CF_2-OCF_2-OCF_2-OCF_3$:
$C_7PEVE$

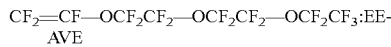
$CF_2=CF-OCF_2CF_2-OCF_2CF_2-OCF_2CF_3$:EEAVE

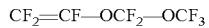
$CF_2=CF-OCF_2-OCF_3$

$CF_2=CF-OCF_2-OCF_2CF_3$

$CF_2=CF-O(CF_2CF(CF_3)O)_2CF_2CF_2CF_3$

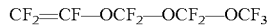
$CF_2=CF-OCF_2-OCF_2-OCF_3$

As the compound (2), C9PEVE, C7PEVE or EEAVE is preferred from such a viewpoint that low-temperature characteristics will be further excellent at the time when the fluorinated elastic copolymer is made into a crosslinked rubber article, and productivity of the fluorinated elastic copolymer will be improved.

The proportion of units b is preferably from 3 to 57 mol % in all units constituting the fluorinated elastic copolymer.

In a case where the units b contain PAVE units, the proportion of the PAVE units is preferably from 3 to 57 mol %, more preferably from 5 to 50 mol %, further preferably from 10 to 40 mol %, in all units constituting the fluorinated elastic copolymer.

In a case where the units b contain POAVE units, the proportion of POAVE units is preferably from 3 to 57 mol %, more preferably from 5 to 40 mol %, further preferably from 8 to 30 mol %, in all units constituting the fluorinated elastic copolymer.

In a case where the units b contain at least one of the units based on ethylene and the units based on propylene, the total proportion of these units is preferably from 3 to 57 mol %, more preferably from 5 to 50 mol %, further preferably from 10 to 45 mol %, in all units constituting the fluorinated elastic copolymer.

In a case where the units b contain at least one of the units based on a monomer having fluorine atoms and a halogen atom other than a fluorine atom, and the units based on a monomer having fluorine atoms and a nitrile group, the total proportion of these units is preferably from 0.001 to 5 mol %, more preferably from 0.001 to 3 mol %, further preferably from 0.001 to 2 mol %, in all units constituting the fluorinated elastic copolymer.

Units c are units based on a fluorinated monomer having at least two polymerizable unsaturated bonds.

The polymerizable unsaturated bond may be a double bond (C=C) or a triple bond (C≡C) between carbon-carbon atoms, and the double bond is preferred. The number of polymerizable unsaturated bonds is preferably from 2 to 6, more preferably 2 or 3, particularly preferably 2.

The fluorinated monomer having at least two polymerizable unsaturated bonds is preferably a perfluoro compound.

As the fluorinated monomer having at least two polymerizable unsaturated bonds, compound (3) is preferred, from such a viewpoint that low-temperature characteristics will be further excellent while maintaining the rubber physical properties at the time when the fluorinated elastic copolymer is made into a crosslinked rubber article.

$CF_2=CFOR^{f3}OCF=CF_2$     (3)

wherein $R^{f3}$ is a $C_{1-25}$ perfluoroalkylene group or a group having at least one etheric oxygen atom between carbon-carbon atoms in a $C_{2-25}$ perfluoroalkylene group.

In $R^{f3}$, the perfluoroalkylene group may be linear or may be branched. The number of carbon atoms in $R^{f3}$ is preferably 3 or 4, from such a viewpoint that low-temperature characteristics will be further excellent while maintaining the rubber physical properties at the time when the fluorinated elastic copolymer is made into a crosslinked rubber article.

Specific examples of the compound (3) may be the following ones. Here, the expressions after the formulae are abbreviations for the compounds.

$CF_2=CFO(CF_2)_2OCF=CF_2$

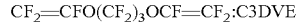
$CF_2=CFO(CF_2)_3OCF=CF_2$:C3DVE

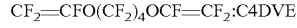
$CF_2=CFO(CF_2)_4OCF=CF_2$:C4DVE

$CF_2=CFO(CF_2)_6OCF=CF_2$

$CF_2=CFO(CF_2)_8OCF=CF_2$

$CF_2=CFO(CF_2)_2OCF(CF_3)CF_2OCF=CF_2$

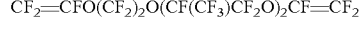
$CF_2=CFO(CF_2)_2O(CF(CF_3)CF_2O)_2CF=CF_2$

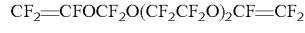
$CF_2=CFOCF_2O(CF_2CF_2O)_2CF=CF_2$

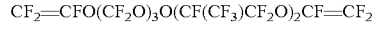
$CF_2=CFO(CF_2O)_3O(CF(CF_3)CF_2O)_2CF=CF_2$

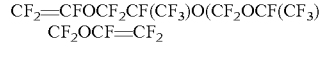
$CF_2=CFOCF_2CF(CF_3)O(CF_2OCF(CF_3)$
$CF_2OCF=CF_2$

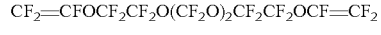
$CF_2=CFOCF_2CF_2O(CF_2O)_2CF_2CF_2OCF=CF_2$

As the compound (3), C3DVE or C4DVE is particularly preferred, from such a viewpoint that low temperature characteristics will be further excellent while maintaining the rubber physical properties at the time when the fluorinated elastic copolymer is made into a crosslinked rubber article.

In all units constituting the fluorinated elastic copolymer, the proportion of the units c is preferably from 0.01 to 1 mol %, more preferably from 0.05 to 0.5 mol %, further preferably from 0.05 to 0.3 mol %.

When the proportion of the units c is at least the lower limit value in the above range, crosslinking reactivity will be excellent, and a crosslinked rubber after crosslinking will be more excellent in tensile strength and compression set under a high temperature. When it is at most the upper limit value in the above range, it is possible to further reduce cracking in a case where a stress of e.g. bending is exerted at a high temperature, while maintaining excellent physical properties as a crosslinked rubber after crosslinking.

The fluorinated elastic copolymer has iodine atoms. The fluorinated elastic copolymer preferably has iodine atoms bonded to terminals of the polymer chain. The terminals of the polymer chain are the concept including both terminals of the main chain and terminals of branched chains.

Iodine atoms in fluorinated elastic copolymer preferably contain iodine atoms derived from the later-described compound of (4). Iodine atoms derived from the compound (4) are introduced into terminals of the polymer chain. Further, the copolymer may contain iodine atoms in units based on a monomer having fluorine atoms and an iodine atom, as units b.

The content of iodine atoms is preferably from 0.01 to 1.5 mass %, more preferably from 0.01 to 1.0 mass %, in the fluorinated elastic copolymer. When the content of iodine atoms is within the above range, crosslinkability of the fluorinated elastic copolymer will be further excellent, and rubber physical properties of the crosslinked rubber article will be further excellent.

Advantageous Effects

The fluorinated elastic copolymer of the present invention as described above, has a branched chain derived from the unit c and has a content of metal elements of at most 20 ppm by mass, and thus, the content of metal elements is low, and crosslinkability is excellent. Therefore, a crosslinked rubber article obtainable by crosslinking the fluorinated elastic copolymer of the present invention is suitable as a sealing material for a semiconductor manufacturing apparatus.

Method for Producing Fluorinated Elastic Copolymer

The method for producing a fluorinated elastic copolymer of the present invention is a method which comprises emulsion-polymerizing monomer components in the presence of a radical polymerization initiator and a compound (4), to obtain a latex containing a fluorinated elastic copolymer, and coagulating the fluorinated elastic copolymer in the latex, by using an acid containing no metal elements. The monomer components are TFE, the above monomer having one polymerizable unsaturated bond (but excluding TFE), and the above fluorinated monomer having at least two polymerizable unsaturated bonds.

$$R^{f4}I_2 \quad (4)$$

wherein $R^{f4}$ is a $C_{1-16}$ polyfluoroalkylene group.

The compound (4) functions as a chain transfer agent. The polyfluoroalkylene group as $R^{f4}$ may be linear or may be branched. As $R^{f4}$, a perfluoroalkylene group is preferred.

The compound (4) may be 1,4-diiodo-perfluorobutane, 1,6-diiodo-perfluorohexane, 1,8-diiodo-perfluorooctane, etc., and from the viewpoint of excellent polymerizability, 1,4-diiodo-perfluorobutane is preferred.

The compound (4) is preferably from 0.005 to 10 parts by mass, more preferably from 0.02 to 5 parts by mass, further preferably from 0.05 to 2 parts by mass, to 100 parts by mass of the monomer components.

The latex containing the fluorinated elastic copolymer is obtainable by an emulsion polymerization method.

In the emulsion polymerization method, the monomer components are polymerized in an aqueous medium containing, for example, a radical polymerization initiator, an emulsifier and the compound (4).

As the radical polymerization initiator, a water-soluble initiator is preferred. The water-soluble initiator may be a persulfate (ammonium persulfate, sodium persulfate, potassium persulfate, etc.), hydrogen peroxide, a water-soluble organic peroxide (disuccinic acid peroxide, diglutaric acid peroxide, tert-butylhydroxyperoxide, etc.), an organic initiator (azobisisobutylamidine dihydrochloride, etc.), a redox initiator made of a combination of a persulfate or hydrogen peroxide, and a reducing agent such as sodium hydrogen bisulfite, sodium thiosulfate or the like, an inorganic initiator of a system letting a small amount of iron, a ferrous salt or silver sulfate be further coexistent with the redox initiator, etc.

The amount of the radical polymerization initiator is preferably from 0.0001 to 5 parts by mass, more preferably from 0.001 to 2 parts by mass, to 100 parts by mass of the monomer components.

The aqueous medium may be water, a mixture of water and a water-soluble organic solvent, etc.

The water-soluble organic solvent may be tert-butanol, propylene glycol, dipropylene glycol, dipropylene glycol monomethyl ether, tripropylene glycol, etc. and from such a viewpoint that the polymerization rate of the monomers will not be lowered, tert-butanol or dipropylene glycol monomethyl ether is preferred.

When the aqueous medium contains a water-soluble organic solvent, dispersibility of the monomers and dispersibility of the fluorinated elastic copolymer will be excellent, and productivity of the fluorinated elastic copolymer will be excellent.

The content of the water-soluble organic solvent is preferably from 1 to 40 parts by mass, more preferably from 3 to 30 parts by mass, to 100 parts by mass of water.

The emulsifier may be an anionic emulsifier, a nonionic emulsifier, a cationic emulsifier, etc., and from such a viewpoint that mechanical and chemical stability of the latex will be further excellent, an anionic emulsifier is preferred.

The anionic emulsifier may be a hydrocarbon emulsifier (sodium lauryl sulfate, sodium dodecylbenzene sulfonate, etc.), a fluorinated emulsifier (ammonium perfluorooctanoate, sodium perfluorooctanoate, ammonium perfluorohexanoate, compound (5), etc.), etc.

$$F(CF_2)_pO(CF(X)CF_2O)_qCF(Y)COOA \quad (5)$$

wherein X and Y are each a fluorine atom or a $C_{1-3}$ linear or branched perfluoroalkyl group, A is a hydrogen atom, an alkali metal or $NH_4$, p is an integer of from 2 to 10, and q is an integer of from 0 to 3.

As the compound (5), the following ones may be mentioned.

$C_2F_5OCF_2CF_2OCF_2COONH_4$ $F(CF_2)_3O(CF(CF_3)CF_2O)_2CF(CF_3)COONH_4$ $F(CF_2)_3OCF_2CF_2OCF_2COONH_4$ $F(CF_2)_3O(CF_2CF_2O)_2CF_2COONH_4$ $F(CF_2)_4OCF_2CF_2OCF_2COONH_4$ $F(CF_2)_4O(CF_2CF_2O)_2CF_2COONH_4$ $F(CF_2)_3OCF_2CF_2OCF_2COONa$ $F(CF_2)_3O(CF_2CF_2O)_2CF_2COONa$

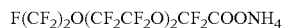

The anionic emulsifier is preferably ammonium perfluorooctanoate, $C_2F_5OCF_2CF_2OCF_2COONH_4$, $F(CF_2)_4OCF_2CF_2OCF_2COONH_4$ or $F(CF_2)_3OCF_2CF_2OCF_2COONH_4$.

The amount of the emulsifier is preferably from 0.01 to 15 parts by mass, more preferably from 0.1 to 10 parts by mass, to 100 parts by mass of the aqueous medium.

The polymerization conditions for the radical polymerization may be suitably selected depending on the monomer composition, and the decomposition temperature of the radical polymerization initiator.

The polymerization pressure is preferably from 0.1 to 20 MPa [gauge], more preferably from 0.3 to 10 MPa [gauge], further preferably from 0.3 to 5 MPa [gauge].

The polymerization temperature is preferably from 0 to 100° C., more preferably from 10 to 90° C., further preferably from 20 to 80° C.

The polymerization time is preferably from 1 to 72 hours, more preferably from 1 to 24 hours, further preferably from 1 to 12 hours.

In order to adjust the pH of the aqueous medium, it is preferred to use a pH buffering agent. The pH buffering agent may, for example, be an inorganic salt. The inorganic salt may be a phosphate such as disodium hydrogen phosphate or sodium dihydrogen phosphate, a carbonate such as sodium hydrogen carbonate or sodium carbonate, etc. More preferred specific examples of the phosphate may be disodium hydrogen phosphate, disodium hydrogen phosphate 12-hydrate, etc.

As compounds (monomer components, a polymerization initiator, an emulsifier, a chain transfer agent, a pH adjusting agent, etc., but excluding an aqueous medium) to be used for the emulsion polymerization, it is preferred not to use compounds having metal elements, from such a viewpoint that it is thereby possible to readily obtain a fluorinated elastic copolymer having a low content of metal elements.

In the aqueous medium to be used for the emulsion polymerization, it is preferred that the content of metal elements is at most 2.0 ppm by mass, from such a viewpoint that it is thereby possible to easily obtain a fluorinated elastic copolymer having a low content of metal elements. The content of metal elements is more preferably at most 1.0 ppm by mass, further preferably at most 0.5 ppm by mass. The lower limit value for the content of metal elements is 0 ppb by mass. As the aqueous medium, ultrapure water is particularly preferred.

The fluorinated elastic copolymer is separated from the latex by coagulation with an acid.

As the acid to be used for the coagulation treatment, from the viewpoint of obtaining a fluorinated elastic copolymer having a low content of metal elements, an acid having no metal elements is used.

The acid having no metal elements may be nitric acid, sulfuric acid, oxalic acid, hydrochloric acid, hydrofluoric acid, trifluoroacetic acid, hydrobromic acid, hydroiodic acid, boric acid, formic acid, acetic acid, citric acid, gluconic acid, lactic acid, etc. As the acid having no metal elements, from such a viewpoint that corrosiveness to metals is low, nitric acid and sulfuric acid are preferred, and nitric acid is particularly preferred from such a viewpoint that the amount of anions derived from the acid, which remain in the finally obtainable fluorinated elastic copolymer, is small, and it is less likely to lower the rubber physical properties of the crosslinked rubber article.

The coagulation treatment with an acid may be carried out, for example, by mixing the latex containing a fluorinated elastic copolymer and an aqueous solution containing an acid (hereinafter referred to also as an acid aqueous solution).

The concentration of the acid in the acid aqueous solution is preferably from 0.1 to 50 mass %, more preferably from 1 to 30 mass %, further preferably from 1 to 10 mass %. When the concentration of the acid is at least the lower limit value in the above range, the fluorinated elastic copolymer tends to be readily coagulated. When the concentration of the acid is at most the upper limit value in the above range, corrosion of a metal equipment (a coagulation tank, a washing tank, a dryer, etc.) to be used for the production of the fluorinated elastic copolymer will be suppressed, and also the amount of anions derived from the acid, remaining in the finally obtainable fluorinated elastic copolymer, will be low, whereby it is less likely to reduce the rubber physical properties of the crosslinked rubber article.

In water to be employed in the preparation of the acid aqueous solution, it is preferred that the content of metal elements is at most 2.0 ppm by mass, from such a viewpoint that it is thereby easy to obtain a fluorinated elastic copolymer having a low content of metal elements. The content of metal elements is more preferably at most 1.0 ppm by mass, further preferably at most 0.5 ppm by mass. The lower limit value for the content of metal elements is 0 ppb by mass. As water, ultrapure water is particularly preferred.

The amount of the acid aqueous solution is preferably at least 10 parts by mass, more preferably from 50 to 1,000 parts by mass, further preferably from 100 to 500 parts by mass, to 100 parts by mass of the fluorinated elastic copolymer. When the amount of the acid aqueous solution is at least the lower limit value in the above range, the fluorinated elastic copolymer tends to be readily coagulated. When the amount of the acid aqueous solution is at most the upper limit value in the above range, it is possible to suppress the amount of wastewater generated by coagulation treatment.

The coagulated fluorinated elastic copolymer, after being recovered by filtration or the like, may be further washed with a liquid medium.

As the liquid medium to be used for washing, from the viewpoint of obtaining a fluorinated elastic copolymer having a low content of metal elements, one having a content of metal elements of at most 2.0 ppm by mass, is used. The content of metal elements is more preferably at most 1.0 ppm by mass, further preferably at most 0.5 ppm by mass. The lower limit value for the content of metal elements is 0 ppb by mass.

The liquid medium to be used for washing may be water or an acid aqueous solution having no metal elements. As the acid aqueous solution having no metal elements, a nitric acid aqueous solution, etc. may be mentioned. The concentration of the acid in the acid aqueous solution is preferably from 0.1 to 50 mass %, more preferably from 1 to 30 mass %, further preferably from 1 to 10 mass %.

From such a viewpoint that it will be easy to obtain a fluorinated elastic copolymer having a content of metal elements of from 0.3 to 20.0 ppm by mass, water is preferred, and ultrapure water is more preferred.

The washed fluorinated elastic copolymer is recovered by filtration. The number of washing may be once or may be two or more times.

The total amount of the liquid medium to be used for washing is preferably at least 10 parts by mass, more preferably from 50 to 1,000 parts by mass, further preferably from 100 to 500 parts by mass, to 100 parts by mass of the fluorinated elastic copolymer. When the total amount of the liquid medium is at least the lower limit value in the above range, the amount of anions derived from the acid, remaining in the fluorinated elastic copolymer, will be small, whereby it is possible to suppress corrosion of a dryer, etc. in a subsequent step, and also it is less likely to lower the rubber physical properties of the crosslinked rubber article. When the total amount of the liquid medium is at most the upper limit value in the above range, it is possible to suppress the amount of wastewater generated by the washing.

The washed fluorinated elastic copolymer is preferably dried under reduced pressure (vacuum dried) at a temperature of lower than 100° C., from the viewpoint of suppressing deterioration of the fluorinated elastic copolymer by heat, and from the viewpoint of suppressing a decrease in rubber physical properties of the crosslinked rubber article. The drying temperature is preferably at most 80° C., more preferably at most 70° C., further preferably at most 60° C. The drying temperature is the temperature of the atmosphere in the dryer.

The pressure at the time of the drying is preferably at most 50 kPa, more preferably at most 30 kPa, further preferably at most 10 kPa. By adjusting the pressure at the time of the drying to be at most the upper limit value in the above range, it is possible to sufficiently dry the fluorinated elastic copolymer even if the drying temperature is made to be low.

With respect to the metal content in the fluorinated elastic copolymer, the amount of metals contained in the fluorinated elastic copolymer can be adjusted by using ones containing metal elements, as the pH buffering agent or radical polymerization initiator at the time of the polymerization, the aqueous medium to be used in the polymerization, the acid aqueous solution in the coagulation treatment with an acid, the liquid medium to be used for washing of the fluorinated elastic copolymer, etc. It is preferred to adjust the metal content of the fluorinated elastic copolymer by using an inorganic salt being a metal salt as the pH buffering agent at the time of the polymerization.

The content of metal elements in the fluorinated elastic copolymer after drying is at most 20.0 ppm by mass, more preferably at most 10.0 ppm by mass, further preferably at most 5.0 ppm by mass. When the content of metal element is at most the upper limit value in the above range, it is possible to sufficiently suppress the release of metal components which affect semiconductor products at the time when the crosslinked rubber article made of the fluorinated elastic copolymer is used as a sealing material for a semiconductor manufacturing apparatus. The lower limit value for the content of metal elements is 0.3 ppm by mass. When the content of metal elements is at least the lower limit value in the above range, crosslinkability of the fluorinated elastic copolymer will be more excellent, and also dispersibility of a filler or reinforcing material will be improved.

Advantageous Effects

In the method for producing a fluorinated elastic copolymer of the present invention as described above, monomer components containing a fluorinated monomer having at least two polymerizable unsaturated bonds are emulsion-polymerized, and the fluorinated elastic copolymer in the obtained latex is coagulated by using an acid having no metal elements, whereby it is possible to obtain a fluorinated elastic copolymer having a low content of metal elements and being excellent in crosslinkability.

Fluorinated Elastic Copolymer Composition

The fluorinated elastic copolymer composition comprises the fluorinated elastic copolymer of the present invention and a crosslinking agent. The fluorinated elastic copolymer composition may contain a crosslinking aid, other additives, etc. as the case requires in a range not to impair the effects of the present invention.

The crosslinking agent may be an organic peroxide, a polyol, an amine, a triazine, etc., and an organic peroxide is preferred, since the crosslinked rubber article will thereby be excellent in productivity, heat resistance and chemical resistance.

The organic peroxide may be a dialkyl peroxide (di-tert-butyl peroxide, tert-butyl cumyl peroxide, dicumyl peroxide, α,α-bis(tert-butylperoxy)-p-diisopropylbenzene, 2,5-dimethyl-2,5-di(tert-butylperoxy)hexane, 2,5-dimethyl-2,5-di(tert-butylperoxy)hexane-3, etc.), 1,1-di(tert-butylperoxy)-3,3,5-trimethylcyclohexane, 2,5-dimethylhexane-2,5-dihydro peroxide, benzoyl peroxide, tert-butylperoxy benzene, 1,3-bis(tert-butylperoxy isopropyl)benzene, 2,5-dimethyl-2,5-di(benzoyl peroxy)hexane, tert-butylperoxy maleic acid, tert-butylperoxy isopropyl carbonate, etc. As the organic peroxide, a dialkyl peroxide is preferred.

The blend amount of the crosslinking agent is preferably from 0.3 to 10 parts by mass, more preferably from 0.3 to 5 parts by mass, further preferably from 0.5 to 3 parts by mass, to 100 parts by mass of the fluorinated elastic copolymer. When the blend amount of the crosslinking agent is within the above range, the crosslinked rubber article will be excellent in balance of the strength and the elongation.

In a case where the fluorinated elastic copolymer composition further contains a crosslinking aid, crosslinking efficiency becomes higher.

The crosslinking aid may be triallyl cyanurate, triallyl isocyanurate, trimethallyl isocyanurate, 1,3,5-triacryloyl-hexahydro-1,3,5-triazine, triallyl trimellitate, m-phenylenediamine bismaleimide, p-quinone dioxime, p,p'-dibenzoyl quinone dioxime, dipropargyl terephthalate, diallyl phthalate, N,N',N'',N'''-tetraallylterephthalamide, a vinyl group-containing siloxane oligomer (polymethylvinylsiloxane, polymethyl phenyl vinyl siloxane, etc.), etc. As the crosslinking aid, triallyl cyanurate, triallyl isocyanurate, or trimethallyl isocyanurate is preferred, and triallyl isocyanurate is particularly preferred.

The blend amount of the crosslinking aid is preferably from 0.1 to 10 parts by mass, more preferably from 0.5 to 5 parts by mass, to 100 parts by mass of the fluorinated elastic copolymer. When the blend amount of the crosslinking aid falls within the above range, the crosslinked rubber article will be excellent in balance of the strength and the elongation.

Other additives may be a metal oxide, a pigment, a filler, a reinforcing material, a processing aid, etc.

In a case where the fluorinated elastic copolymer composition further contains a metal oxide, the crosslinking reaction will proceed promptly and reliably.

As the metal oxide, an oxide of a divalent metal, such as magnesium oxide, calcium oxide, zinc oxide or lead oxide may be mentioned.

The blend amount of the metal oxide is preferably from 0.1 to 10 parts by mass, more preferably from 0.5 to 5 parts by mass, to 100 parts by mass of the fluorinated elastic copolymer. When the blend amount of the metal oxide is within the above range, the crosslinked rubber article will be excellent in balance between the strength and the elongation.

The filler or reinforcing material may be carbon black, titanium oxide, silicon dioxide, clay, talc, polytetrafluoroethylene, polyvinylidene fluoride, polyvinyl fluoride, polychlorotrifluoroethylene, a TFE/ethylene copolymer, a TFE/propylene copolymer, a TFE/vinylidene fluoride copolymer, etc.

The processing aid may be a known one. As the processing aid which expresses a function as a lubricant, a fatty acid metal salt (sodium stearate, calcium stearate, etc.), a synthetic wax (polyethylene wax, etc.), a fatty acid ester (glycerol monooleate, etc.), etc. may be mentioned.

The fluorinated elastic copolymer composition is obtainable by kneading the fluorinated elastic copolymer and a crosslinking agent, and, as the case requires, a crosslinking aid or other additives, by a kneading method using a known kneading apparatus such as a twin roll, a kneader or a Banbury mixer.

Crosslinked Rubber Article

The crosslinked rubber article is one having the fluorinated elastic copolymer or fluorinated elastic copolymer composition of the present invention crosslinked.

The crosslinked rubber article may be a crosslinked rubber sheet, an O-ring, a sheet gasket, an oil seal, a diaphragm, a V-ring, a component for a semiconductor manufacturing apparatus, a chemically resistant sealant, a coating material, a wire covering material, etc.

The crosslinked rubber article can be suitably used as a component for a semiconductor manufacturing apparatus, since the content of metal elements is low.

The component for a semiconductor manufacturing apparatus made of the crosslinked rubber article, may be a sealing material (an O-ring, a square ring, a gasket, a packing, an oil seal, a bearing seal, a lip seal, etc.), a tube, a hose, various rubber rolls, a diaphragm, a lining or the like.

The semiconductor manufacturing apparatus may be an etching apparatus (a dry etching apparatus, a plasma etching apparatus, a reactive ion etching apparatus, a reactive ion beam etching apparatus, a sputtering etching apparatus, an ion beam etching apparatus, a wet etching apparatus, an ashing apparatus, etc.), a washing apparatus (a dry etching washing device, a UV/$O_3$ washing device, an ion beam washing device, a laser beam washing device, a plasma washing device, a gas etching washing device, an extraction washing device, a Soxhlet extractive washing device, a high temperature and high pressure extractive washing device, a microwave extraction washing device, a supercritical extractive washing device, etc.), an exposure apparatus (a stepper, a coater-developer, etc.), a polishing apparatus (a CMP apparatus, etc.), a film deposition apparatus (a CVD apparatus, a sputtering apparatus, etc.), a diffusion and ion injection apparatus (an oxidation diffusion apparatus, an ion injecting apparatus, etc.), etc.

The crosslinked rubber article is obtainable by suitably molding and crosslinking the fluorinated elastic copolymer or fluorinated elastic copolymer composition of the invention, by known methods.

The crosslinking method may be a method by heating, or a method by irradiation of ionizing radiation.

The molding method may be an injection molding method, an extrusion molding method, a coextrusion molding method, a blow molding method, a compression molding method, an inflation molding method, a transfer molding method, a calendar molding method, etc.

In a case where the fluorinated elastic copolymer composition contains an organic peroxide as a crosslinking agent, crosslinking by heating is preferred.

As a specific method for the production of a crosslinked rubber article by crosslinking by heating, for example, a hot press molding method may be mentioned. In the hot press molding method, by using a heated mold and filling the fluorinated elastic copolymer composition in the mold cavity having a desired shape, followed by heating, it is possible to obtain a crosslinked rubber article by conducting crosslinking (hot press crosslinking) at the same time as molding. The heating temperature is preferably from 130 to 220° C., more preferably from 140 to 200° C., further preferably from 150 to 180° C.

In the case of employing a hot press molding method, it is also preferred that a crosslinked rubber article obtained by hot press crosslinking (referred to also as primary crosslinking) is, if necessary, further heated by an oven using electricity, hot air, steam, etc. as a heat source, to let the crosslinking be progressed (referred to also as secondary crosslinking). The temperature at the time of the secondary crosslinking is preferably from 150 to 280° C., more preferably from 180 to 260° C., further preferably from 200 to 250° C. The secondary crosslinking time is preferably from 1 to 48 hours, more preferably from 4 to 24 hours. By sufficiently conducting the secondary crosslinking, rubber physical properties of the crosslinked rubber article will be improved. Further, a residue of the peroxide contained in the crosslinked rubber article will be decomposed and volatilized, and thus will be reduced. The hot press molding method is preferably applied to molding of a sealing material or the like.

The ionizing radiation in the method by irradiation of ionizing radiation may be electron beams, gamma rays, etc. In the case of crosslinking by irradiation of ionizing radiation, a method is preferred wherein in advance the fluorinated elastic copolymer or fluorinated elastic copolymer composition is molded into a desired shape, and then, ionizing radiation is irradiated to crosslink it. The molding method may be a method of applying a suspension solution having the fluorinated elastic copolymer or fluorinated elastic copolymer composition dissolved or dispersed in a suitable solvent, followed by drying to form a coating film, or a method of extrusion-molding the fluorinated elastic copolymer or fluorinated elastic copolymer composition to form it into a shape of a hose or electric wire. The irradiation dose of ionizing radiation is suitably set, and is preferably from 1 to 300 kGy, more preferably from 10 to 200 kGy.

EXAMPLES

Hereinafter, the present invention will be described in more detail with reference to Examples, but the present invention is not limited to these Examples.

Ex. 1 and 2 are Examples of the present invention, and Ex. 3 to 5 are Comparative Examples.

Measurements, Evaluations

The proportions of the respective units in a fluorinated elastic copolymer were obtained from the $^{19}$F-NMR analysis, the fluorine content analysis, and the infrared absorption spectrum analysis.

The content of iodine atoms in a fluorinated elastic copolymer was quantified by an apparatus having an automatic sample combustion device (a pretreatment apparatus for ion chromatograph) (manufactured by Dia Instruments Co., AQF-100) and an ion chromatograph combined.

The content of metal elements in ultrapure water was obtained by totaling contents of 29 types of metal elements (Fe, Na, K, Li, Be, Mg, Al, Ca, Ti, V, Cr, Mn, Co, Ni, Cu, Zn, Ga, Rb, Sr, Zr, Mo, Ag, Cd, In, Sn, Cs, Ba, Pb and Bi) measured by the absolute calibration curve method by using an inductively coupled plasma mass spectrometer (ICP-MS 7500cs (product name), manufactured by Agilent Technologies, Inc.).

The content of metal elements in a fluorinated elastic copolymer was obtained by totaling contents of 29 types of metal elements (Fe, Na, K, Li, Be, Mg, Al, Ca, Ti, V, Cr, Mn, Co, Ni, Cu, Zn, Ga, Rb, Sr, Zr, Mo, Ag, Cd, In, Sn, Cs, Ba, Pb and Bi) measured by the absolute calibration curve method by using an inductively coupled plasma mass spectrometer (ICP-MS 7500cs (product name), manufactured by Agilent Technologies, Inc.), with respect to a liquid obtained by putting the fluorinated elastic copolymer in a platinum crucible and ashing it in a high temperature electrically heated furnace, followed by sulfuric acid white smoke treatment and dissolution in dilute nitric acid.

The content of metal elements in a fluorinated elastic copolymer-containing molded product was obtained by totaling contents of 29 types of metal elements (Fe, Na, K, Li, Be, Mg, Al, Ca, Ti, V, Cr, Mn, Co, Ni, Cu, Zn, Ga, Rb, Sr, Zr, Mo, Ag, Cd, In, Sn, Cs, Ba, Pb and Bi) measured by the absolute calibration curve method by using an inductively coupled plasma mass spectrometer (ICP-MS 7500cs (product name), manufactured by Agilent Technologies, Inc.), with respect to a liquid obtained by immersing a fluorinated elastic copolymer-containing O-ring in 100 mL of 3.4% hydrochloric acid, at room temperature for 24 hours.

Production of Fluorinated Elastic Copolymer

In the following Ex., as ultrapure water, one having a content of metal elements of 0.1 ppm by mass, was used.

Ex. 1

After degassing a stainless steel pressure reactor having an internal volume of 2,100 mL provided with an anchor blade, 804 g of ultrapure water, 80.1 g of a 30 mass % solution of $C_2F_5OCF_2CF_2OCF_2COONH_4$, 0.72 g of C3DVE, 1.8 g of a 5 mass % aqueous solution of disodium hydrogen phosphate 12-hydrate, and 0.87 g of 1,4-diiodo-perfluorobutane were charged, and the gas phase was replaced with nitrogen. While stirring at a speed of 600 rpm by using an anchor blade, after the internal temperature became 80° C., 13 g of TFE and 65 g of PMVE were injected into the vessel. The internal pressure in the reactor was 0.90 MPa [gauge]. 20 mL of a 1 mass % aqueous solution of ammonium persulfate was added, to initiate polymerization. When the added ratio of monomers injected before initiation of the polymerization (hereinafter referred to as initial monomers) is represented by a molar ratio, TFE:PMVE: C3DVE=25:75:0.19.

Along with the progress of the polymerization, at the time when the internal pressure of the reactor was lowered to 0.89 MPa [gauge], TFE was injected to raise the internal pressure of the reactor to 0.90 MPa [gauge]. This operation was repeated, and every time when 8 g of TFE was injected, 7 g of PMVE was also injected At the time when the total added mass of TFE became 80 g, addition of the monomers to be injected after initiation of the polymerization (hereinafter referred to as the "post-addition monomers") was terminated, and the internal temperature of the reactor was cooled to 10° C., to terminate the polymerization reaction thereby to obtain a latex containing a fluorinated elastic copolymer. The polymerization time was 185 minutes. With respect to the total added masses of the post-addition monomers, TFE was 80 g and PMVE was 63 g, and when they were converted to a molar ratio, TFE:PMVE=65:35.

Nitric acid (manufactured by Kanto Chemical Co., Inc., special grade) was dissolved in ultrapure water to prepare a 3 mass % aqueous solution of nitric acid. The latex was added to the nitric acid aqueous solution in a vessel made of a TFE/perfluoro(alkyl vinyl ether) copolymer (PFA), to coagulate the fluorinated elastic copolymer. The amount of the nitric acid aqueous solution was 150 parts by mass to 100 parts by mass of the fluorinated elastic copolymer in the latex.

The coagulated fluorinated elastic copolymer was recovered by filtration, put in ultrapure water in a PFA vessel and washed by stirring at 200 rpm for 30 minutes. The amount of ultrapure water to 100 parts by mass of the fluorinated elastic copolymer was 100 parts by mass. The above washing was repeated 10 times.

The washed fluorinated elastic copolymer was recovered by filtration and dried under reduced pressure at 50° C. at 10 kPa, to obtain a white fluorinated elastic copolymer. The molar ratio of the respective units in the fluorinated elastic copolymer was TFE units:PMVE units:C3DVE units=65.9: 34.0:0.1, and the content of iodine atoms was 0.15 mass %.

The content of metal elements in the fluorinated elastic copolymer was 1.0 ppm.

Ex. 2

After degassing a stainless steel pressure reactor having an internal volume of 3,200 mL provided with an anchor blade, 1,500 g of ultrapure water, 59 g of disodium hydrogenphosphate 12-hydrate, 0.7 g of sodium hydroxide, 197 g of tert-butanol, 9 g of sodium lauryl sulfate, 9 g of 1,4-diiodo-perfluorobutane, 9.8 g of C3DVE and 6 g of ammonium persulfate were added. Further, an aqueous solution having 0.4 g of ethylenediamine tetraacetic acid disodium salt dihydrate (hereinafter referred to as EDTA) and 0.3 g of ferrous sulfate heptahydrate dissolved in 100 g of ultrapure water, was added to the reactor. The pH of the aqueous medium in the reactor was 9.5.

Then, at 25° C., a mixed gas (TFE/P=88/12 (molar ratio)) of TFE and propylene (hereinafter referred to also as P) was injected so that the internal pressure of the reactor became 2.50 MPa [gauge]. The anchor blade was rotated at 300 rpm, and a 2.5 mass % aqueous solution (hereinafter referred to as a Rongalite 2.5 mass % solution) of hydroxy methane sulfinic acid sodium dihydrate (hereinafter referred to as Rongalite) with the pH adjusted to 10.0 by sodium hydroxide, was added to the reactor to initiate the polymerization reaction. Thereafter, the Rongalite 2.5 mass % aqueous solution was continuously added to the reactor.

At the time when the total added amount of the mixed gas of TFE/P became 1,000 g, addition of the Rongalite 2.5 mass % aqueous solution was terminated, and the internal temperature of the reactor was cooled to 10° C. to terminate the polymerization reaction, to obtain a latex containing a fluorinated elastic copolymer. The total added amount of the Rongalite 2.5 mass % aqueous solution was 68 g. The polymerization time was 6 hours.

The latex was added to the aqueous solution of nitric acid in the same PFA steel vessel as in Ex. 1 thereby to coagulate the fluorinated elastic copolymer. However, the concentration of the nitric acid aqueous solution was made to be 10 mass %. The amount of the nitric acid aqueous solution was 150 parts by mass to 100 parts by mass of the fluorinated elastic copolymer in the latex.

The coagulated fluorinated elastic copolymer was recovered by filtration, put in ultrapure water in a PFA vessel and washed by stirring at 200 rpm for 30 minutes. The amount of ultrapure water was 100 parts by mass to 100 parts by mass of the fluorinated elastic copolymer. The above washing was repeated 10 times.

The washed fluorinated elastic copolymer was recovered by filtration and dried at 100° C. for 15 hours to obtain a white fluorinated elastic copolymer. The molar ratio of the respective monomers in the fluorinated elastic copolymer was TFE units:P units:C3DVE units=56.0:43.9:0.1, and the content of iodine atoms was 0.07 mass %.

The content of metal elements in the fluorinated elastic copolymer was 15.0 ppm.

Ex. 3

In Ex. 1, the coagulated fluorinated elastic copolymer was recovered by filtration, and washing by an acid aqueous solution and washing by ultrapure water were conducted by the following methods.

The recovered fluorinated elastic copolymer was put into a previously prepared acid aqueous solution (a 0.5 mass % aqueous solution of nitric acid), and washed by stirring at 200 rpm for 30 minutes. The amount of the acid aqueous solution was 150 parts by mass to 100 parts by mass of the fluorinated elastic copolymer. This washing was repeated three times.

Thereafter, it was put into ultrapure water in a PFA vessel and washed by stirring at 200 rpm for 30 minutes. The amount of ultrapure water was 100 parts by mass to 100 parts by mass of the fluorinated elastic copolymer. This washing was repeated seven times.

The washed fluorinated elastic copolymer was recovered by filtration and vacuum-dried at 50° C. at 10 kPa, to obtain a white fluorinated elastic copolymer. The composition of the fluorinated elastic copolymer was the same as in Ex. 1. The content of metal elements in the fluorinated elastic copolymer was 0.2 ppm.

Ex. 4

In Ex. 1, at the time of coagulating the latex, a 5 mass % aqueous solution of aluminum potassium sulfate was used instead of the nitric acid aqueous solution. The amount of the aluminum potassium sulfate aqueous solution was 150 parts by mass to 100 parts by mass of the fluorinated elastic copolymer in the latex.

The coagulated fluorinated elastic copolymer was recovered by filtration and washed in the same manner as in Ex. 1.

The washed fluorinated elastic copolymer was recovered by filtration and dried in the same manner as in Ex. 1 to obtain a white fluorinated elastic copolymer. The composition of the fluorinated elastic copolymer was the same as in Ex. 1. The content of metal elements in the fluorinated elastic copolymer was 120.0 ppm.

Ex. 5

In this Ex., a fluorinated elastic copolymer containing no units c was produced.

After degassing a stainless steel pressure reactor having an internal volume of 2,100 mL provided with an anchor blade, 804 g of ultrapure water, 80.1 g of a 30 mass % solution of $C_2F_5OCF_2CF_2OCF_2COONH_4$, 1.8 g of a 5 mass % aqueous solution of disodium hydrogen phosphate 12-hydrate, and 0.87 g of 1,4-diiodo perfluorobutane, were charged, and the gas phase was replaced with nitrogen. While stirring at a speed of 600 rpm by using an anchor blade, after the internal temperature became 80° C., 13 g of TFE and 65 g of PMVE were injected into the vessel. The internal pressure of the reactor was 0.90 MPa [gauge]. 20 mL of a 1 mass % aqueous solution of ammonium persulfate was added to initiate the polymerization. When the added ratio of monomers injected before initiation of the polymerization (hereinafter referred to as the initial monomers) was represented by a molar ratio, it was TFE:PMVE=25:75.

Along with the progress of the polymerization, at the time when the internal pressure of the reactor was lowered to 0.89 MPa [gauge], TFE was injected to raise the internal pressure of the reactor to 0.90 MPa [gauge]. This operation was repeated, and every time when 8 g of TFE was injected, 7 g of PMVE was also injected.

At the time when the total added mass of TFE became 80 g, addition of the monomers injected after initiation of the polymerization (hereinafter referred to as "post-addition monomers") was terminated, and the internal temperature of the reactor was cooled to 10° C. to terminate the polymerization reaction, to obtain a latex containing a fluorinated elastic copolymer. The polymerization time was 180 minutes. With respect to the total added masses of the post-addition monomers, TFE was 80 g, and PMVE was 63 g, and when they were converted to a molar ratio, TFE:PMVE=65:35.

In the same manner as in Ex. 1, the latex was coagulated, washed and dried to obtain a white fluorinated elastic copolymer. The molar ratio of the respective units in the fluorinated elastic copolymer was TFE units:PMVE units=68.0/32.0, and the content of metal elements was 1.0 ppm.

Production of Fluorinated Elastic Copolymer Composition 100 parts by mass of the fluorinated elastic copolymer in Ex. 1, 15 parts by mass of carbon black, 3 parts by mass of triallyl isocyanurate, 1 part by mass of 2,5-dimethyl-2,5-di (tert-butylperoxy)hexane (manufactured by NOF Corporation, Perhexa (registered trademark) 25B), and 1 part by mass of calcium stearate, were kneaded by a twin roll, to obtain a fluorinated elastic copolymer composition of Ex. 1. Also with respect to the fluorinated elastic copolymers in Ex. 2 to 5, fluorinated elastic copolymer compositions of Ex. 2 to 5 were obtained in the same manner.

With respect to the respective fluorinated copolymer compositions, evaluation of crosslinkability was conducted by using a crosslinking property measuring instrument (manufactured by Alpha Technology Co., Ltd., RPA), whereby good crosslinking was confirmed with respect of the fluorinated elastic copolymer compositions in Ex. 1 and 2. In Ex. 3, the crosslinking properties were lower than in Ex. 1.

Production of Crosslinked Rubber Article 100 parts by mass of the fluorinated elastic copolymer in Ex. 1, 0.5 part by mass of triallyl isocyanurate, and 0.5 part by mass of 2,5-dimethyl-2,5-di(tert-butylperoxy) hexane (manufactured by NOF Corporation, Perhexa (registered trademark) 25B) were kneaded by a twin roll to obtain a fluorinated elastic copolymer composition of Ex. 1. With respect of the fluorinated elastic copolymer composition of Ex. 1, after conducting hot pressing (primary crosslinking) at 150° C. for 20 minutes, secondary crosslinking was conducted in an oven of 250° C. for 4 hours to obtain a crosslinked rubber O-ring (P-26) of the fluorinated elastic copolymer composition of Ex. 1.

With respect to the crosslinked rubber O-ring obtained as described above, the content of metal elements was examined by ICP-MS, whereby the content of metal elements was 0.6 ppm in total.

INDUSTRIAL APPLICABILITY

The fluorinated elastic copolymer of the present invention can be used for ordinary rubber products. It is applicable to a corrosion-resistant rubber coating material, a sealing material for anti-urea type grease, a rubber coating material, an adhesive rubber, a hose, a tube, a calendar sheet (roll), a sponge, a rubber roll, an oil drilling member, a heat dissipation sheet, a solution crosslinked product, a rubber sponge, a bearing seal (anti-urea grease), a lining (chemically resistant), an automotive insulation sheet, an insulating sheet for electronic apparatus, a rubber band for a watch, an endoscopic packing (amine resistant), a bellows hose (processed from a calendar sheet), water heater packing/valve, fenders (marine civil engineering, marine), fibers, nonwoven fabrics (protective clothing, etc.), a base sealing material, rubber gloves, a stator for uniaxial eccentric screw pump, a component for a urea SCR system, an anti-vibrating material, a vibration-controlling material, a sealing material, additives to other materials, an application to a toy, etc.

In particular, since the content of metal elements is low and it is excellent in crosslinkability, it can be suitably used as a sealing material for a semiconductor manufacturing apparatus.

What is claimed is:

1. A fluorinated elastic copolymer having iodine atoms and having units a based on tetrafluoroethylene, units b based on a monomer having one polymerizable unsaturated bond (but excluding tetrafluoroethylene), and units c based on a fluorinated monomer having at least two polymerizable unsaturated bonds, wherein the metal content is at least 0.3 ppm by mass and at most 20.0 ppm by mass.

2. The fluorinated elastic copolymer according to claim 1, wherein the units b are at least one type selected from units based on a compound represented by the following formula (1), units based on a compound represented by the following formula (2), units based on ethylene, and units based on propylene, $$CF_2=CFOR^{f1} \quad (1)$$

(wherein $R^{f1}$ is a $C_{1-10}$ perfluoroalkyl group), $$CF_2=CF(OCF_2CF_2)_n-(OCF_2)_m-OR^{f2} \quad (2)$$

(wherein $R^{f2}$ is a $C_{1-4}$ perfluoroalkyl group, n is an integer of from 0 to 3, m is an integer of from 0 to 4, and n+m is an integer of from 1 to 7).

3. The fluorinated elastic copolymer according to claim 2, wherein the units b are at least one type selected from units based on a compound represented by the above formula (1) wherein the number of carbon atoms in $R^{f1}$ is from 1 to 3, units based on a compound represented by the above formula (2) being any of compounds represented by the following formulae, and units based on propylene:

$$CF_2=CF-OCF_2CF_2-OCF_2-OCF_2-OCF_2-OCF_2-OCF_3$$

$$CF_2=CF-OCF_2CF_2-OCF_2-OCF_2-OCF_3$$

$$CF_2=CF-OCF_2CF_2-OCF_2CF_2-OCF_2CF_3.$$

4. The fluorinated elastic copolymer according to claim 1, wherein the units c are units based on a compound represented by the following formula (3):

$$CF_2=CFOR^{f3}OCF=CF_2 \quad (3)$$

(wherein $R^{f3}$ is a $C_{1-25}$ perfluoroalkylene group or a group having at least one etheric oxygen atom between carbon-carbon atoms in a $C_{2-25}$ perfluoroalkylene group).

5. The fluorinated elastic copolymer according to claim 4, wherein the units c are units based on any of compounds represented by the following formulae:

$$CF_2=CFO(CF_2)_3OCF=CF_2$$

$$CF_2=CFO(CF_2)_4OCF=CF_2.$$

6. A fluorinated elastic copolymer composition comprising a fluorinated elastic copolymer as defined in claim 1, and a crosslinking agent.

7. A crosslinked rubber article obtained by crosslinking the fluorinated elastic copolymer as defined in claim 1.

8. A crosslinked rubber article obtained by crosslinking the fluorinated elastic copolymer composition as defined in claim 6.

9. A method for producing a fluorinated elastic copolymer as defined in claim 1, which comprises emulsion polymerizing tetrafluoroethylene, a monomer having one polymerizable unsaturated bond (but excluding tetrafluoroethylene), and a fluorinated monomer having at least two polymerizable unsaturated bonds, in the presence of a radical polymerization initiator and a compound represented by the following formula (4), to obtain a latex containing a fluorinated elastic copolymer, and coagulating the fluorinated elastic copolymer in the latex by using an acid containing no metal element:

$$R^{f4}I_2 \quad (4)$$

wherein $R^{f4}$ is a $C_{1-16}$ polyfluoroalkylene group.

10. The method for producing a fluorinated elastic copolymer according to claim 9, wherein after said coagulation, the coagulated copolymer is washed by using a liquid medium wherein the content of metal elements is at most 2 ppm by mass.

* * * * *